March 21, 1950     P. R. UFER     2,501,424
PUSH-TYPE FULL VISION SWATHER

Filed Oct. 28, 1947     3 Sheets-Sheet 1

Inventor

Paul R. Ufer

By Clarence A. O'Brien
and Harvey B. Jacobson
Attorneys

March 21, 1950 P. R. UFER 2,501,424
PUSH-TYPE FULL VISION SWATHER
Filed Oct. 28, 1947 3 Sheets-Sheet 2
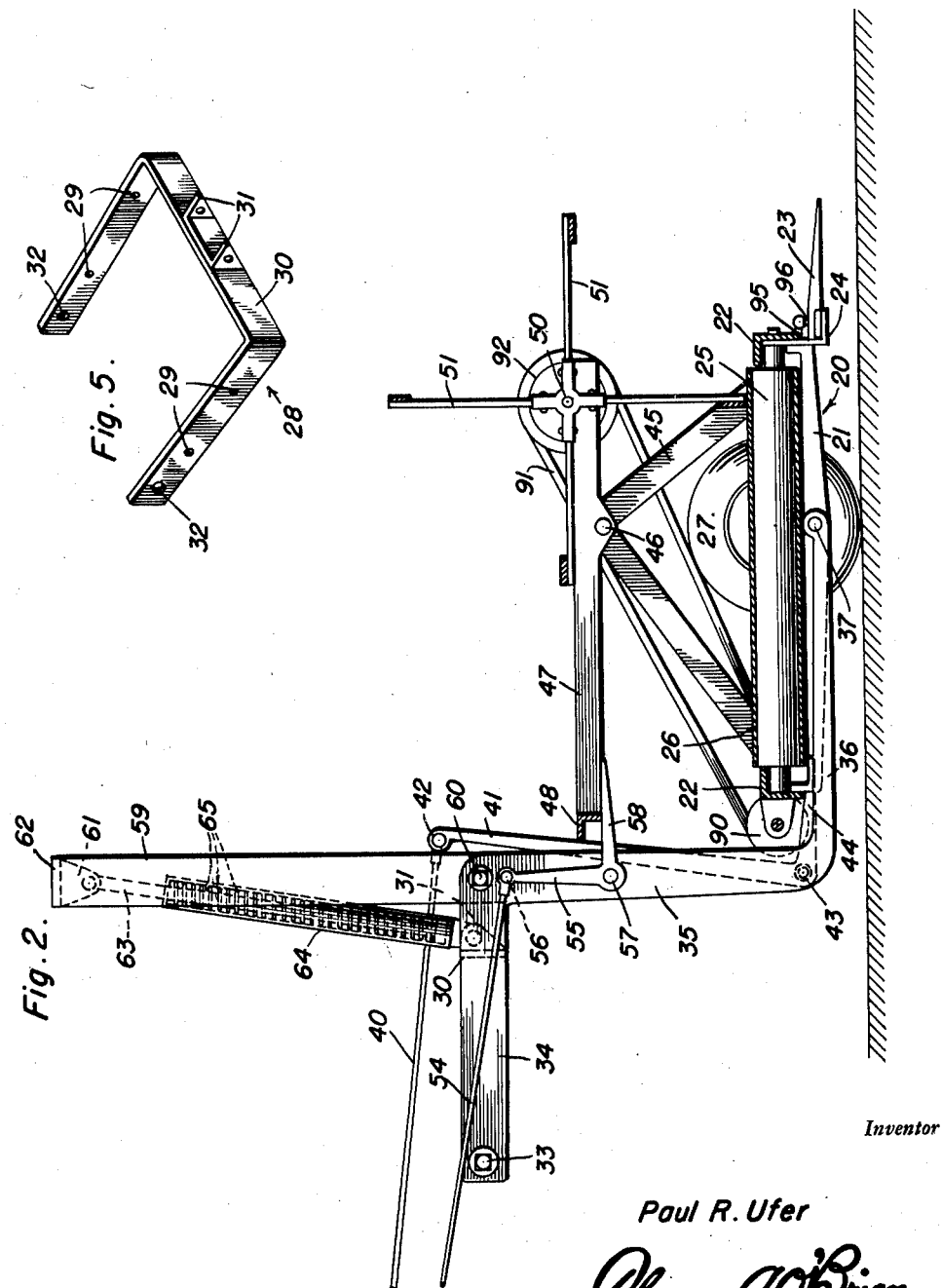
Inventor
Paul R. Ufer
By *Clarence A. O'Brien*
and *Harvey B. Jacobson*
Attorney

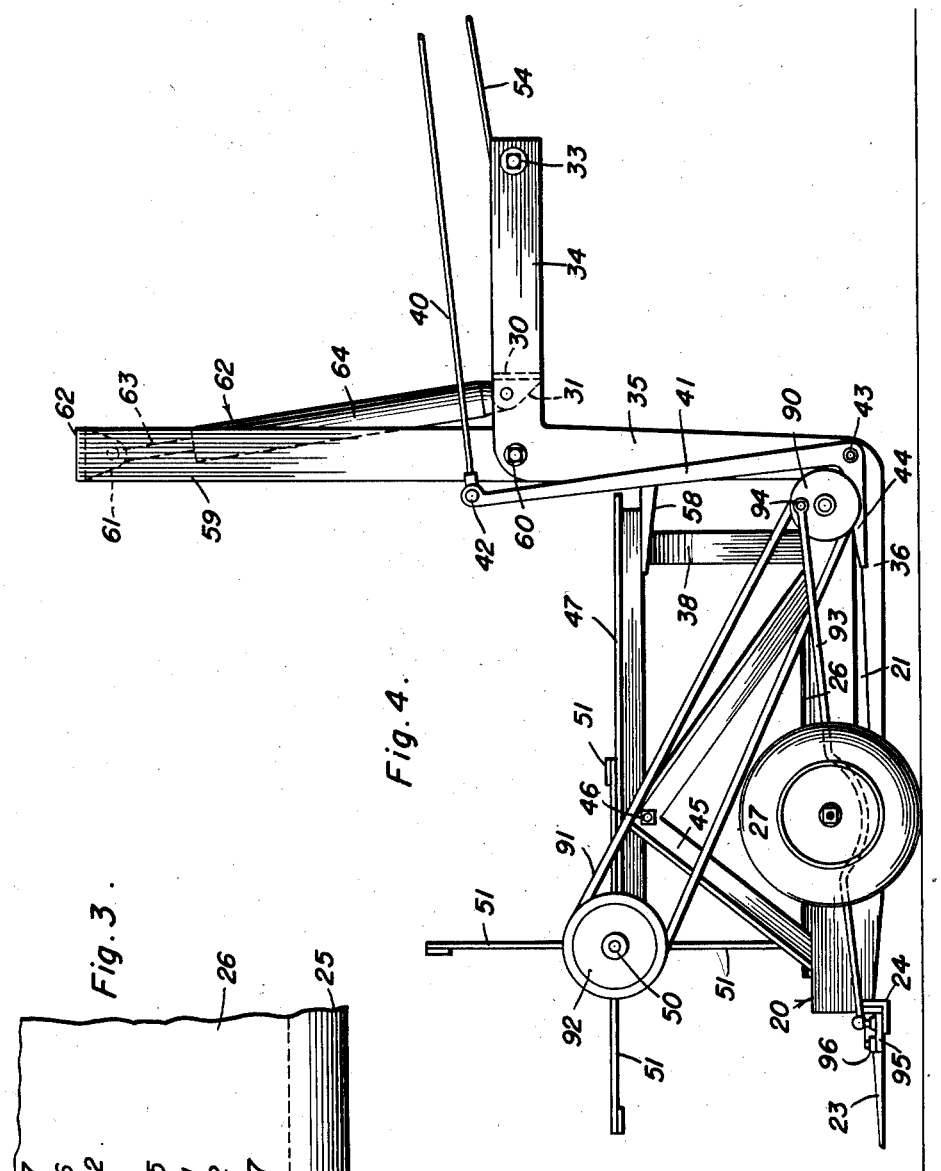

UNITED STATES PATENT OFFICE 2,501,424

PUSH-TYPE FULL VISION SWATHER

Paul R. Ufer, Truman, Minn.

Application October 28, 1947, Serial No. 782,555

7 Claims. (Cl. 56—23)

This invention relates to harvesters and more particularly to reapers or a push-type full vision swather, for cutting grain and hay and laying the same in windrows at one side of the sickle upon the stubble of the cut grain and away from the uncut grain defining one margin of the swath, to be gathered, such as by a combine, hay baler or hay loader or otherwise preparing the grain for threshing.

The object of the invention is to provide a push-type full vision swather or reaper, by which full vision of the grain being cut is provided as the machine is advanced along in front of a tractor to which it is coupled and from which it is driven from the power take-off thereof, while also providing means for raising and lowering the sickle from the driver's seat as well as the reel, to tip the hay or grain onto the conveyor for delivery to one side in windrows, so that the tractor wheels will not run over the same, full vision being provided for the operator to guard against such damage to the grain.

Another object of the invention is to provide a reaper or swather which is adapted to be coupled to the front of a tractor and driven from the power take-off thereof to operate the sickle, reel and conveyor, and to provide means for separating the cut grain from the uncut grain as well as permitting the operation of the device around the outside of a field, or through the same so as to cut the growing grain in two and in either instance, to lay the swath neatly to one side ready for the next cutting, in addition to permitting cutting close to a fence or corner by turning the tractor sharply or in a short turn at each end or at the corner of a field or swath being cut.

Another object of the invention is to provide means for cushioning the movements of the swather with respect to the tractor at the mounting frame thereof, and convenient means for raising and lowering the reel as well as the platform, sickle and conveyor, the moving parts being driven from the power take-off of the tractor and the device being simple in construction, light in weight and convenient and easy to operate.

Other objects and advantages reside in the details of construction and operation as more fully hereinafter described and claimed, reference being had to the accompanying drawings forming part hereof, wherein like numerals refer to like parts throughout, and in which:

Figure 2 is an enlarged fragmentary vertical sectional view through the device detached from the tractor.

Figure 3 is a fragmentary enlarged plan view showing the driving connections from the power take-off to the conveyor and leading to the reel and sickle.

Figure 4 is a side elevation showing the driving connection for the sickle and reel and looking from the opposite side from the direction in which Figure 2 is taken, and Figure 5 is a perspective view of a bracket employed for connection with a hydraulic pump or shock absorber.

Figure 1:
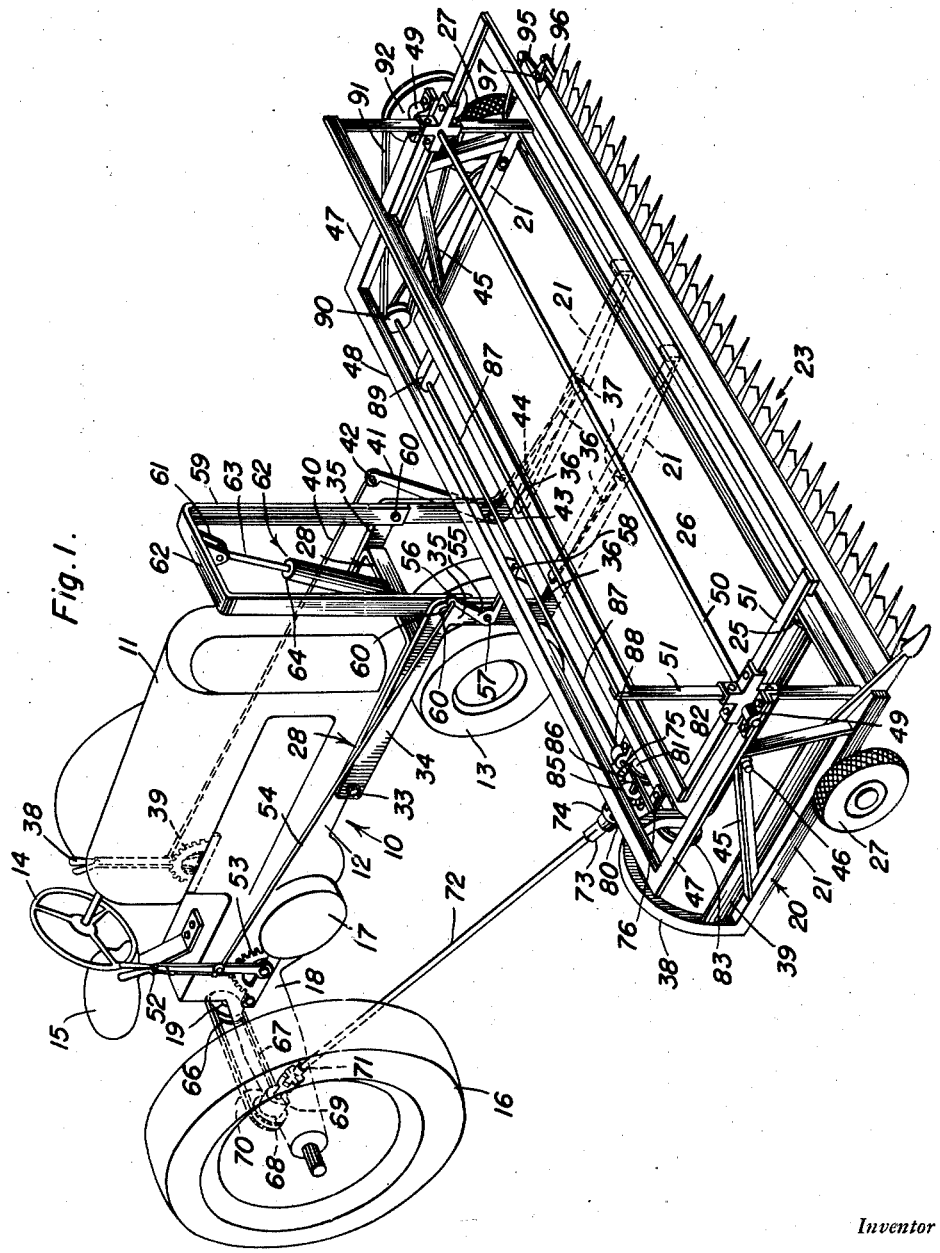
Figure 1 is a perspective view of a reaper or push-type full vision swather operatively connected to a tractor for driving and controlling the same.

Referring to the drawings in detail, the device is shown mounted at the front of a tractor 10 having the usual hood 11 mounting the engine on the frame of the tractor which is provided with side members 12 constituting the frame of the machine, front steering wheels 13 controlled by a wheel 14 from the driver's seat and rear drive wheels 16 which are usually spread apart a considerably greater distance than the front steering wheels designed primarily for making short turns. The differential housing is indicated at 17 having the oppositely extending axle housings 18 and a power take-off shaft 19 at the rear.

The invention proper comprises a frame or platform 20 comprising suitably spaced longitudinal bars 21 to which transverse bars 22 are connected in order to mount the sickle or sickle bar 23 across the front such as in suitable depending brackets or hangers 24. The bars or angle members 22 arranged in spaced parallel relation transversely of the platform or frame are designed to rotatably support rollers 25 in longitudinal position at opposite ends of the frame to take a conveyor belt 26 which delivers to one side of the machine, the grain cut by the sickle 23 and is disposed rearwardly of the latter. The frame is mounted to move along on side wheels 27, the axles of which project from the sides of the frame in the rear of the sickle bar and front edge of the platform and conveyor, at the desired height to cut the grain or hay. The horizontal frame or platform 20 is supported from the side bars or sides of the frame of the tractor and for this purpose, a U-shaped bracket 28 as more particularly shown in Figure 5 of the drawings, has its legs or arms bolted through holes 29 to the sides of the chassis frame and the bight portion 30 thereof positioned in front of the tractor frame and centrally provided or formed with spaced vertical pivot ears 31. Holes 32 are also provided near the extremities of the legs or arms to take pivot bolts 33 which pivotally mount angular or substantially Z-shaped arms 34 thereon with their upper portions extending horizontally forwardly in front of the bight portion 30 of the bracket 28 and in front of the frame of the tractor and steering wheels 13, at which point they are provided with forwardly inclined depending portions 35 to give good clearance to the steering wheel 13 to permit short or sharp turns of the tractor and the swather coupled thereto at the front. The lower ends of the portion 35 are provided with forwardly extending arms 36 pivoted at 37 to the frame bars 21 preferably below the axes of the wheels 27 to permit the frame or platform 20 to pivot thereon up and down, to raise and lower the sickle 23 and also the front of the conveyor 26 depending upon the height at which it is desired to cut the grain or hay. One side or end of the frame 20 is arched at the back as indicated at 38, providing an open space between one end of the conveyor 26 and the side of the frame, through which the grain is delivered as cut in windrows, upon the stubble at this point and an inclined divide board curved downwardly and inwardly as indicated at 39, causes the grain or hay to fall away from the grain wheel neatly in a windrow to be gathered or taken up by a combine, hay bailer or loader.

As thus described, the horizontal frame or platform 20 is thus pivotally mounted on the arms 36 of the bracket arms 34, which latter are also adapted to swing up and down on the pivots 33 and in order to raise or lower the sickle by pivoting the platform 20, an adjustable throw lever 38 cooperating with a segment 39 of notch character, is mounted at one side of the tractor frame in convenient reach of the operator upon the seat 15 and is connected by a rod or link 40 with one arm of an angle or a bellcrank lever 41 at the upper end of the long arm thereof extending upwardly, to which it is pivoted as indicated at 42 at its forward end. The lever 41 is pivoted at 43 to the depending portion 35 near its lower end where the arms 36 extend forwardly and the other arm 44 of the angular or bellcrank lever 41 extends beneath the bar 22 across the rear of the frame 20 so that the latter may be tilted or moved on its pivot 37 to raise and lower the sickle and the front end of the conveyor so that the same may be disposed at the proper or desired height.

Disposed at each end of the frame 20 is a reel support bracket 45 shown as having an inverted V-shaped form with forwardly and rearwardly inclined arms, the upper crotch of which forms a bearing for pivots 46 pivotally mounting a reel supporting frame 47 extending horizontally above the frame 20 with the pivots in both instances forwardly of their longitudinal centers. The reel frame 47 is U-shaped in plan, with side arms and a connecting portion 48 at the back. The forward ends of the sides or arms carry bearings 49 in which the shaft 50 of a reel 51 is designed to turn, said reel having any suitable number of arms or flails designed to tip the grain or hay as cut by the sickle 23, upon the conveyor 26 to be discharged at one side in windrows over which the arch 38 or opening provided thereby permits free passage of the grain as cut and in windrows, without the wheels of the tractor running over the same and in clear vision of the operator upon the seat 15.

In order to tilt the reel up and down to raise and lower the same through the medium of the frame 47, a similar adjustable throw lever 52 is mounted at the opposite side of the tractor frame to cooperate with a notch segment 53 and is connected by a link or rod 54 to one end of an angular or bell-crank lever 55 pivotally at the upper end of the long arm of the latter as indicated at 56, the lever 55 being pivoted at 57 at its angular portion to the adjacent depending portion 35 of the other bracket arm 34 and having its arm 58 extending forwardly beneath the rear or connecting portion 48 of the reel frame 47, whereby to raise and lower the reel with respect to the sickle and conveyor.

As previously stated, the arms 34 are adapted to swing up and down on the pivots 33 but are supported and held upwardly from the bracket 28 by another inverted U-shaped bracket 59 which is pivotally anchored at the extremities of its arms or legs as indicated at 60, to the angular portions of the forward ends of the arms 34 and provided with spaced pivot ears or lugs 61 centrally of its top or bight portion 62 to which in conjunction with the pivot ears or lugs 31 of the bracket 28 a hydraulic pump or shock absorber 62 is connected to cushion the movements of the frame 20 up and down and if desired, for the purpose of raising and lowering the same. The shock absorber includes a piston rod 63 and a cylinder 64 enclosing the piston and a spring 65 if desired, and provision may be made for supplying hydraulic fluid or oil under pressure from the tractor to raise and lower the same by forcing upwardly on the piston or the device may merely act as a shock absorber to cushion the support of the frame 20. In this way, the transmission of shocks to the tractor and frame is prevented.

In order to drive the sickle in its reciprocating action and to rotate the reel with the arms or flails thereof moving downwardly or rearwardly at the bottom to tip the grain or hay which is cut, the power take-off shaft 19 is provided with a V-pulley 66 around which a belt 67 is trained in connection with a pulley 68 on the rear end of a short shaft 69 journalled in a bearing 70 consisting of a housing with roller bearings or other anti-friction bearings holding the shaft in place and permitting rotation thereof without undue friction. The forward end of the shaft 69 is connected by a universal joint 71 to the rear end of a forwardly inclined shaft 72, the forward end of which is squared to slidably connect to a squared sleeve 73 of a knuckle or universal joint 74 so that the shaft can shorten or lengthen when raising or lowering the platform 20 in addition to compensating for the different angular relations thereof. The knuckle or universal joint 74 connects with a short stub shaft 75 rotatably supported in the rear frame bar 22 in a bearing bracket 76 bolted to the same is indicated at 77 at the top at one side and at the bottom at the other side which is positioned at a lower level to extend beneath the frame 20 and below the portion 76, between which is bolted as indicated at 79 a suitable anti-friction bearing 80 for the shaft 75 which carries a V-pulley 81 around which an endless belt 82 is trained to also engage a V-pulley 83 fixed to a shaft 84 at the rear end of the roller 25 of the conveyor 26 at the same side of the machine and frame, for the purpose of driving the conveyor. The shaft 75 also carries a bevelled pinion 85 which meshes with a pinion 86, preferably smaller, on the adjacent end of a horizontal transversely extending shaft 87 journalled in a bearing 88 on the bracket member 78 and extends across the rear of the frame in which it may be supported by an additional bearing 89. This end of the shaft projects from the side of the frame or platform 20 and carries a V-pulley 90 around which an endless belt 91 is trained in connection with a larger pulley 92 fixed to the adjacent end of the reel shaft 50 to rotate the reel. The pulley 90 also serves as a crank disk and has a pitman rod 93 eccentrically pivoted thereto as at 94 for connection with one arm of a bell-crank lever 95 at its forward end, which is in turn connected to the sickle bar at the extremity of its upper end, as indicated at 96 and pivotally mounted upon the frame 20 as indicated at 97 to reciprocate the sickle bar and actuate the cutting mechanism. Thus, by adjusting of the throw levers 38 and 52, the cutter and belt or conveyor 26 may be raised and lowered to cut the grain or hay at the proper height and as the machine is pushed by the tractor across a field, a clear swath is cut, said parts being driven from the power take-off of the tractor. Grain is tipped onto the conveyor 26, and is discharged at one side, clear of the drive wheels 16 of the tractor so as to not run over the same and damage the grain as laid in windrow to be gather. All of the mechanism is in clear view or vision of the operator upon the seat 15, and the hydraulic mechanism of the take-off may be operated to start and stop the drive whenever desired, especially when making short turns around the edge of a field or to cut the latter in two, whichever is the handiest. Also, the device can make short or sharp turns close to a fence or at a corner, as short as the tractor will turn, and may be operated in a simple and efficient manner.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. A push-type full vision swather adapted for attachment to the front of a tractor comprising a supporting bracket for mounting on the frame of the tractor in front thereof, a horizontal wheeled frame pivoted to said bracket, means on the tractor and operatively connected to the frame to raise and lower the same at its front end, a sickle operatively disposed across the front of the frame, a conveyor belt disposed in the frame and terminating in spaced relation to one end thereof, a second frame pivoted upon the first frame, a reel rotatably journalled in the second frame, means for rotating the reel and operating the conveyor and sickle from the power take-off of the tractor, means for clearing the grain from the conveyor at the front of the frame and sickle, means on the tractor for tilting the reel frame about a horizontal axis for vertically swinging the front portion of the reel, and a hydraulic shock absorber connected between the front of the bracket on the tractor and the supporting bracket of the frame to cushion the movements thereof up and down.

2. The combination with a tractor having a power take-off, bracket arms pivoted to the sides of the tractor frame and extending forwardly thereof, a bracket rigidly mounted on the tractor frame, a bracket mounted on the arms, a shock absorber disposed between said brackets, a horizontal frame pivoted on said arms, a conveyor mounted horizontally across the frame from one end to a point in spaced relation to the other end to permit grain to pass therethrough, a sickle at the forward edge of the frame, a second frame pivotally supported on the first frame and above the same, a reel journalled at the forward portion of the second frame and superimposed on the conveyor and sickle for tipping the grain cut by the sickle onto the conveyor, means for driving the conveyor, sickle and reel from the power take-off of the tractor, means on the tractor for tilting the first frame to raise and lower the sickle and conveyor, and means on the tractor for vertically swinging the second frame about a horizontal axis to raise and lower the reel with respect to the sickle and conveyor and means for locking said frames in adjusted positions.

3. The combination with a tractor having a power take-off, a U-shaped bracket fixed to the sides of the tractor frame or chassis and having a bight portion extending in front thereof, arms pivoted to the sides of the frame at their rear end and extending forwardly of the bracket, an inverted U-shaped bracket pivoted to said arms, a hydraulic shock absorber disposed between the bight portion of the latter bracket and the first bracket, said arms having downwardly and forwardly extending portions, a horizontal frame pivoted forwardly upon the forward ends of said arms and means carried by the forward ends of the arms for sustaining the frame thereon, a conveyor extending across said frame horizontally and terminating in spaced relation to one side thereof, wheels for the frame, a sickle bar mechanism disposed across the front edge of the frame in front of the conveyor, a second frame pivoted upon the ends of the first frame and tiltably held thereon, a reel rotatably mounted in the forward portion of the second frame and overlying the conveyor and sickle, a bearing supported upon one of the axle housings of the tractor, a shaft rotatably mounted in said bearing and operatively connected to the power take-off drive, a shaft journalled transversely across the rear of the first frame and operatively geared to the first named shaft at one side of the tractor, means between the second named shaft and the conveyor for driving the latter from one end, means at the opposite end of the shaft in rear of the frame first mentioned to rotate the reel and reciprocate the sickle bar mechanism from the power take-off, means on the tractor for raising and lowering the first frame by tilting the same on its pivot and means on the tractor for raising and lowering the second frame and reel by also tilting the same upon its pivot.

4. A swather comprising a wheel frame, said frame being disposed horizontally, a sickle at the forward edge of the frame, a conveyor operating across the frame in the rear of the sickle and terminating in spaced relation near one end of the frame for discharge of the grain through an opening provided thereby, a second horizontal frame supported upon end pivots above the first frame and open at the front, a reel rotatably mounted in the forward end of said second frame over the conveyor, means for pivotally supporting the wheeled frame from the frame of a tractor in front thereof to be pushed by the tractor, means to drive the sickle, conveyor and reel from the tractor and means for selectively tilting the lower frame about a horizontal axis and for tilting the sickle about a horizontal axis.

5. A swather of the class described comprising a bracket adapted to be mounted at the front of the tractor frame, arms adapted to be pivoted at the sides of the tractor frame and extending downwardly and forwardly therefrom, hydraulic means between the bracket and arms to cushion the movement of the arms up and down, a wheeled frame horizontally positioned and pivoted forwardly of the longitudinal center thereof on the forward ends of the arms, a conveyor extending across the frame and terminating in spaced relation to one end thereof for discharge of the grain or hay being cut by the device, a sickle at the front of the frame to cut the grain or hay, said frame having a clearance space for the passage of the grain at the rear of one end, brackets supported upon the ends of the first frame, a reel frame pivoted forwardly of its longitudinal center to said brackets, a reel journalled in the forward portion of the second frame, means for driving the conveyor, sickle and reel from the power take-off of the tractor, means for tilting the first frame from the tractor, and means for tilting the second frame from the tractor.

6. A swather of the class described comprising a bracket adapted to be mounted at the front of the tractor frame, arms adapted to be pivoted at the sides of the tractor frame and extending downwardly and forwardly therefrom, means between the bracket and arms to cushion the movement of the arms up and down, a wheeled frame horizontally positioned and pivoted forwardly of the longitudinal center thereof on the forward ends of the arms, means formed on said arms for sustaining the frame thereon, a conveyor extending across the frame and terminating in spaced relation to one end thereof for discharge of the grain or hay being cut by the device, a sickle at the front of the frame to cut the grain or hay, said frame having a clearance space for the passage of the grain at the rear of one end, brackets supported upon the ends of the first frame, a reel frame pivoted forwardly of its longitudinal center to said brackets, a reel journalled in the forward portion of the second frame, said tractor having a power take-off, a shaft having a belt connection with said power take-off and journalled upon an axle housing of the tractor, a shaft journalled across the rear portion of the first frame and operatively connected to the reel to rotate the latter and to the sickle to reciprocate the sickle bar thereof, said first shaft having universal connections at the front and rear and gear connections with the second shaft at the rear of the first frame and a sliding connection at the forward end of the first shaft adjacent the rear end of the first frame permitting lengthening and shortening of said shaft upon raising and lowering of the first frame, a throw lever on the tractor having a bellcrank lever pivoted to the arms and engaged beneath the rear portion of the first frame to tilt the latter about a horizontal axis to raise and lower the front end thereof together with the sickle and conveyor and a second throw lever also mounted on the tractor and having a bellcrank connection therewith at another of said arms for engagement beneath the rear end of the second frame to tilt the latter and the reel about a horizontal axis.

7. A swather of the class described comprising a bracket adapted to be mounted at the front of the tractor frame, arms pivotally mounted at the sides of the tractor frame and extending downwardly and forwardly thereof, an inverted U-shaped bracket secured to said arms and hydraulic shock absorbing means connected between said bracket and the bracket mounted on the tractor frame, a wheeled frame horizontally disposed in advance of the front of the tractor frame, said frame being pivoted on the forward ends of the arms, a conveyor extending across the frame and terminating in spaced relation to one end thereof, a sickle operatively disposed at the front of the frame, brackets supported on said frame, a reel frame pivotally mounted to said brackets, a reel journalled in the forward portion of the reel frame, means for simultaneously operating said reel, conveyor and sickle, said means including drive transmission means associated with the power plant of a tractor, means for tilting said frame including a bell crank operating arm, an actuating means for said arm, said arm being engaged beneath the rear portion of the frame to tilt the same about a horizontal axis, means for tilting said reel frame about a horizontal axis.

PAUL R. UFER.

REFERENCES CITED

The following references are of record in the file of this patent:

UNITED STATES PATENTS

| Number | Name | Date |
|---|---|---|
| 1,312,388 | Converse | Aug. 5, 1919 |
| 1,917,352 | Apel | July 11, 1933 |